United States Patent [19]

Tamura

[11] Patent Number: 4,676,517

[45] Date of Patent: Jun. 30, 1987

[54] FUEL TANK VENT PIPE ARRANGEMENT IN VEHICLE BODY CONSTRUCTION

[75] Inventor: Masaki Tamura, Zama, Japan

[73] Assignee: Nissan Motor Co., Ltd., Yokohama, Japan

[21] Appl. No.: 909,260

[22] Filed: Sep. 19, 1986

[30] Foreign Application Priority Data

Sep. 20, 1985 [JP] Japan ................ 60-208319

[51] Int. Cl.[4] .............................................. B62D 39/08
[52] U.S. Cl. ................................ 280/5 A; 220/85 S; 296/1 C
[58] Field of Search ............... 280/5 R, 5 A, 783; 220/85 S, 86 R, 88 R, DIG. 27; 296/1 C

[56] References Cited

U.S. PATENT DOCUMENTS

| | | | |
|---|---|---|---|
| 4,394,925 | 7/1983 | Rump | 280/5 A |
| 4,469,339 | 9/1984 | Watanabe et al. | 280/5 A |
| 4,550,923 | 11/1985 | Ogawa et al. | 280/5 A |

FOREIGN PATENT DOCUMENTS 57-163418 10/1982 Japan .

Primary Examiner—John J. Love
Assistant Examiner—Donn McGiehan
Attorney, Agent, or Firm—Schwartz, Jeffery, Schwaab, Mack, Blumenthal & Evans

[57] ABSTRACT

A fuel tank vent pipe is disposed in part on the upper side of a rear floor panel and passes through openings formed in the rear floor panel and a wheel house inner for connection with a fuel tank and an inlet end of a filler neck. A receptacle-like protector unit encloses a space which is sealingly separated from an adjacent space above the rear floor panel. The aforementioned part of the vent pipe is disposed in the space enclosed by the protector unit. The filler neck has a portion bent rearwardly so as to pass under a rear cross member at its bent-up portion.

8 Claims, 3 Drawing Figures

FUEL TANK VENT PIPE ARRANGEMENT IN VEHICLE BODY CONSTRUCTION

BACKGROUND OF THE INVENTION

1. Field of the Invention

The present invention relates in general to vehicle body constructions and more particularly to a fuel tank vent pipe arrangement in a vehicle body construction.

2. Description of the Prior Art

A fuel tank vent pipe spans between a top wall of a fuel tank and an inlet end of a filler neck to allow air to move out of the fuel tank upon fuel filling.

As shown in FIG. 3, in many small-sized cars a fuel tank 22 is disposed in the space below a rear floor panel 21 and right under a rear seat (not shown) for the safety reason against fire and with a view to attaining a spacious luggage compartment.

The above described space below the rear floor panel 21 is protected by a rigid rear side member 23 so that the fuel tank 22 is less likely to be damaged upon lateral-end collision of the vehicle, making it possible to attain the safety of the fuel tank relatively easily. However, in view of the piping of the vent pipe 24 the aforementioned space is undesirable for the following reason. A filler neck 25 is bent rearwardly so as to pass under the rear side member 23 at its bent-up portion. The filler neck 25 further extends through the inside of a wheel house 26 to be attached at its inlet end 25a to a wheel house outer or the like. The vent pipe 24 has an end 24a attached to the top wall of the fuel tank 22 to project into the inside of same and the other end 24b attached to the inlet end 25a of the filler neck 25 to communicate the inside of same. The intermediate portion 24c of the vent pipe 24 cannot be bent into a U-shape similarly to the filler neck 25 so as to pass under the rear side member 23 at its bent-up portion since fuel or the like is likely to stagnate in the U-shaped intermediate portion of the vent pipe 24 to deteriorate its air venting action. For this reason, the vent pipe 24 cannot be arranged so as to pass under the rear side member 23 at its bent-up portion but is in effect arranged so as to pass the inside of the rear side member 23 through notch-like openings 27, 27 formed by stamping or the like in the flanges 23a, 23a of the rear side member 3.

A disadvantage of the prior art vent pipe arrangement is that it is complicated in stucture since due to the provision of the openings 27, 27 in the rear side member 23 additional reinforcement members are necessitated in order to retain a predetermined rigidity of the vehicle body. Another disadvantage is that sufficient care should be given to the sealing of the openings 27, 27 since incomplete sealing of the openings 27, 27 will cause rusting of the inner wall of the rear side member 23, leading to a lowered productivity. A further disadvantage is that it is impossible to increase the clearance between the fuel tank 22 and the ground without raising the entire of the floor panel 21, resulting in increased design restrictions on vehicle body and a difficulty in attaining spacious passenger and luggage compartments.

SUMMARY OF THE INVENTION

In accordance with the present invention, there is provided a novel and improved fuel tank vent pipe arrangement in a vehicle body construction which comprises a rear floor panel, a fuel tank disposed on the lower side of the rear floor panel, a filler neck attached to the fuel tank and extending away therefrom in the lateral direction of the vehicle body to terminate in an inlet end, a vent pipe disposed in part on the upper side of the rear floor panel for providing communication between the fuel tank and the inlet end of the filler neck, the rear floor panel being formed with a taking-in opening through which the vent pipe passes for connection with the fuel tank, a wheel house inner having a taking-out opening through which the vent pipe passes for connection with the inlet end of the filler neck, and a receptacle-like protector unit installed on the upper side surface of the rear floor panel to enclose a space which is sealingly separated from the adjacent space above the rear floor panel, the part of the vent pipe being received within the space.

The above structure is quite effective for overcoming the above noted disadvantages and shortcomings inherent in the prior art arrangement.

It is accordingly an object of the present invention to provide a novel and improved fuel tank vent pipe arrangement in a vehicle body construction which does not require additional reinforcement members for retaining a predetermined rigidity of the vehicle body.

It is another object of the present invention to provide a novel and improved fuel tank vent pipe arrangement of the above described character which can increase the clearance between the fuel tank and the ground without raising the entire of the rear floor panel.

It is a further object of the present invention to provide a novel and improved fuel tank vent pipe arrangement of the above described character which makes it easy to attain spacious passenger and luggage compartments.

It is a further object of the present invention to provide a novel and improved fuel tank vent pipe arrangement of the above described character which can assure the safety of the fuel tank, improve the productivity and reduce the design restrictions on the vehicle body.

DETAILED DESCRIPTION OF THE PREFERRED EMBODIMENT

Figure 1:
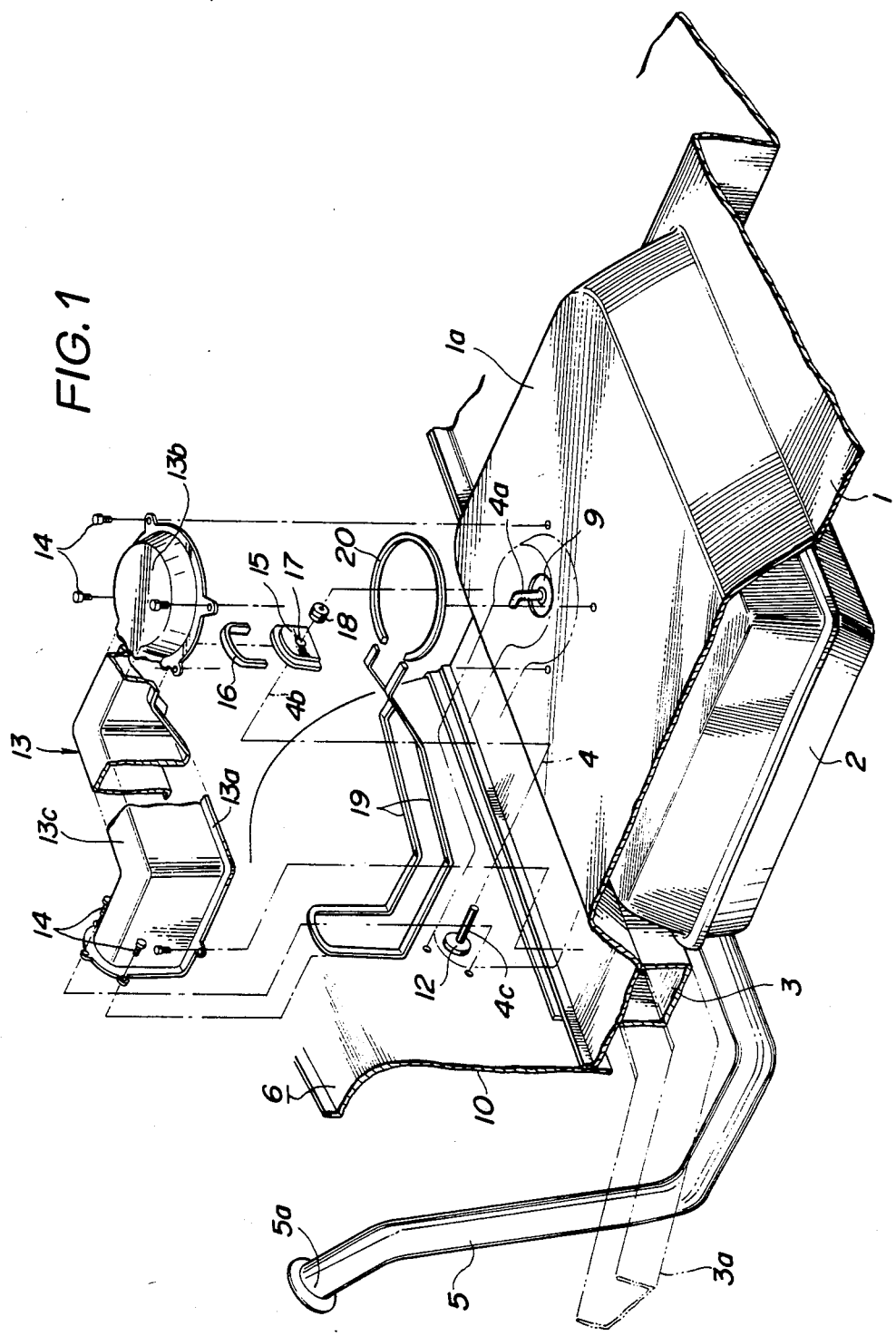
FIG. 1 is an exploded view of a fuel tank vent pipe arrangement in a vehicle body according to an embodiment of the present invention when viewed from the tail end of the vehicle body.
Figure 2:
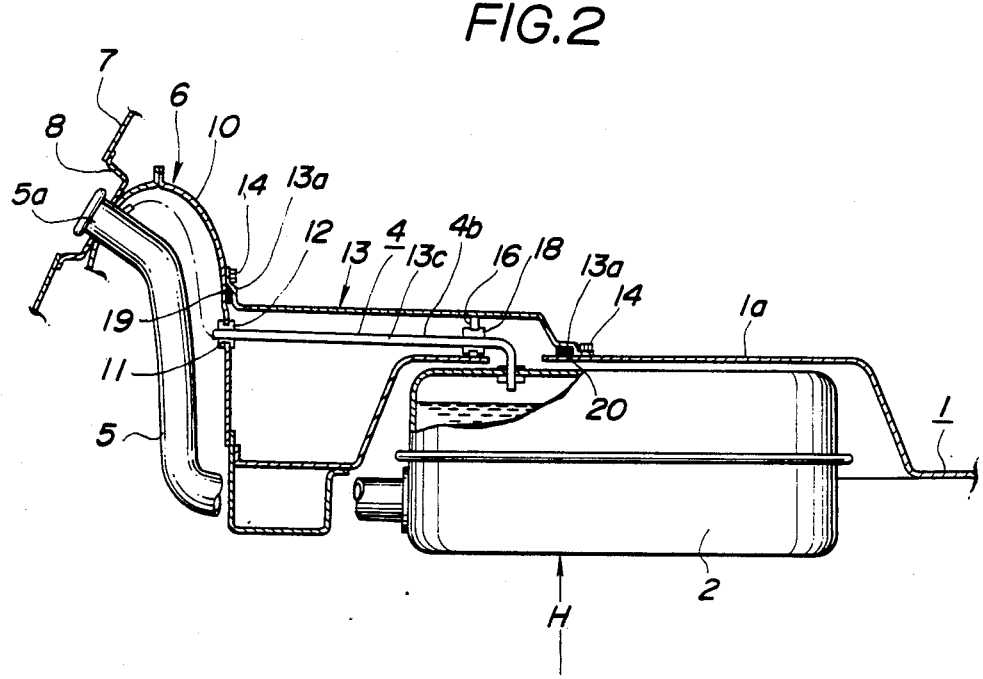
FIG. 2 is a sectional view taken along a sectional plane extending in the vehicle width direction and showing the fuel tank vent pipe arrangement of FIG. 1.
Figure 3:
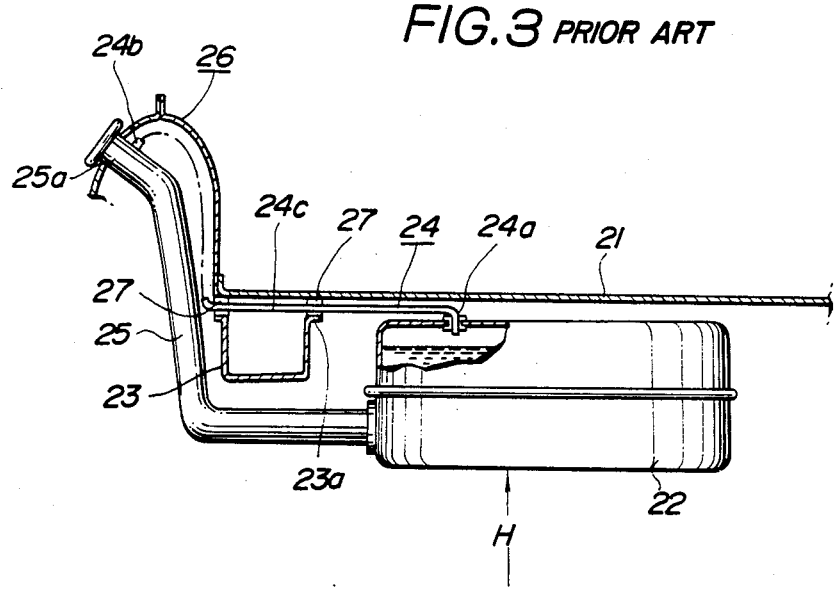
FIG. 3 is a view similar to FIG. 2 but showing a prior art fuel tank vent pipe arrangement.

Referring to FIGS. 1 and 2, a fuel tank vent pipe arrangement of this invention includes a fuel tank 2 which is disposed in a higher position as compared with the prior art arrangement of FIG. 3 so as to increase the clearance H between the fuel tank 2 and the ground considerably. To this end, a rear floor panel 1 is formed with an upwardly recessed portion 1a which is so sized as to be able to receive therewithin an upper half portion of the fuel tank 2. A filler neck 5 is disposed on the outer side of the fuel tank 2 opposing in the vehicle width direction to the inner side and bent rearwardly to pass under the bent-up portion 3a of a rear side member 3 shown by the two-dot chain lines. The filler neck 5 further extends through the inside of a wheel house 6 to be attached at its inlet end 5a to a filler base 8 which is in turn secured to a rear fender panel 7 or the like.

The upwardly recessed portion 1a of the rear floor panel 1 is formed at its top with a taking-in opening 9 for allowing an inner end 4a of the vent pipe 4 to pass therethrough. The inner end 4a of the vent pipe 4 is attached to the top wall of the fuel tank 2 to project into the inside of same. The vent pipe 4 extends through the taking-in opening 9 into the upper side of the rear floor panel 1 to have an intermediate portion 4b disposed above the rear floor panel 1. The vent pipe 4 further extends through a taking-out opening 11 formed in a wheel house inner 10 into the inside of the wheel house 6 and is attached at its outer end 24b to the inlet end 5a of the filler neck 5. The taking-out opening 11 is provided with a grommet 12 for providing a seal between inside and outside of the wheel house 6.

The space, which is located above the rear floor panel 1 and receives therewithin the intermediate portion 4b of the vent pipe 4, is sealingly covered by a receptacle-like protector 13. The protector 13 is formed from a sheet metal by stamping or the like and adapted to cover at the opposite end portions thereof the taking-in and taking-out openings 9, 11. The protector 13 is generally channel-shaped in cross section and has at its peripheral end a sealing flange 13a. The sealing flange 13a is secured with a plurality of screws 14 to the upper side surface of the rear floor panel 1 and the inward side surface of the wheel house inner 10. More specifically, the protector 13 consists of a cup-shaped portion 13b sealingly covering the taking-in opening 9 which is not provided with a grommet or the like sealing member and a main body portion 13c of an L-like configuration. At the transition from the cup-shaped portion 13b to the main body portion 13c there is provided a partition plate 15 to separate the inside of the protector 13 into a taking-in opening side space and a wheel house side space which lies generally in a lower position than the taking-in opening side space. A U-shaped sealing member 16 is disposed between the periphery of the partition plate 15 and the inner face of the protector 13, while a seal between the periphery of the partition plate 15 and the corresponding upper face of the rear floor panel 1 is provided by a sealing layer which is applied thereto by coating. A seal between the vent pipe 4 and an opening 17 in the partition plate 15 for allowing the vent pipe 4 to pass therethrough can be attained easily by a grommet type rubber sealing member 18.

Further, the sealing flange 13a of the protector 13 and the corresponding panel face of the vehicle body there are disposed a belt-like sealing member 19 corresponding in shape to the sealing flange 13a of the cup-shaped portion 13b to provide a seal between the sealing flange 13a and the corresponding panel face.

With the foregoing arrangement, the space, which is located above the rear floor panel 1 and receives therewithin the intermediate portion 4b of the vent pipe 4, is completely separated from an adjacent vehicle compartment so that water, mud or the like outside of the vehicle body is prevented from ingress into the vehicle compartment. More specifically, while the splash or the like can enter into the smaller taking-in opening side space in the inside of the protector 13, it can not ingress into the larger wheel house side space since the taking-in opening side space is sealingly separated from the wheel house side space by the partition wall 15. Further, the rear side member 3 can effect its inherent function as a rigid member since it is secured at its entire flange to the rear floor panel 1 and the wheel house inner 10. Further, as will be understood from the comparison between FIG. 2 and FIG. 3, it becomes possible to increase the clearance between the fuel tank 2 and the ground by forming the upwardly recessed portion 1a in the rear floor panel 1 since the intermediate portion 4b of the vent pipe 4 is disposed above the rear floor panel 1, whereby the safety of the fuel tank 2 is further assured.

What is claimed is:

1. A fuel tank vent pipe arrangement in a vehicle body construction comprising:
   a rear floor panel;
   a fuel tank disposed on the lower side of said rear floor panel;
   a filler neck attached to said fuel tank and extending away therefrom in the lateral direction of the vehicle body to terminate in an inlet end; a vent pipe disposed in part on the upper side of said rear floor panel for providing communication between said fuel tank and the inlet end of said filler neck;
   said rear floor panel being formed with a taking-in opening through which said vent pipe passes for connection with said fuel tank;
   a wheel house inner having a taking-out opening through which said vent pipe passes for connection with the inlet end of said filler neck; and
   a receptacle-like protector unit installed on the upper side surface of said rear floor panel to enclose a space which is sealingly separated from the adjacent space above the rear floor panel, said part of said vent pipe being received within said space.

2. A fuel tank vent pipe arrangement as set forth in claim 1 wherein said protector unit comprises a receptacle-like protector covering said space and a partition plate separating said space into a first space section associated with said taking-in opening and a second space section associated with said taking-out opening, said first space section being open to the atmosphere through said taking-in opening while said second space section being sealingly closed.

3. A fuel tank vent pipe arrangement as set forth in claim 2 wherein said receptacle-like protector is generally channel-shaped in cross section and includes a cup-shaped portion covering said taking-in opening and a main body portion covering said taking-out opening, said partition plate being disposed between said cup-shaped portion and said main body portion and having an opening through which said vent pipe passes.

4. A fuel tank vent pipe arrangement as set forth in claim 3 wherein said protector has a peripheral flange and is secured thereat with a plurality of screws to said wheel house inner and said rear floor panel.

5. A fuel tank vent pipe arrangement as set forth in claim 4 wherein said vent pipe has an end attached to a top wall of said fuel tank to communicate with the inside of same and the other end attached to the inlet end of said filler neck to communicate with the inside of same.

6. A fuel tank vent pipe arrangement as set forth in claim 5 wherein said protector unit further comprises sealing means for providing a seal between said taking-out opening and said vent pipe, a seal between said opening of said partition plate and said vent pipe, a seal between said main body portion and its associated side surface of said wheel house inner and said rear floor panel, a seal between said cup-shaped portion and its associated side surface of said rear floor panel, a seal between the periphery of said partition plate and the inner wall of said protector and a seal between said partition plate and its associated side surface of said rear floor panel.

7. A fuel tank vent pipe arrangement as set forth in claim 1 wherein said rear floor panel has an upwardly recessed portion receiving therein part of said fuel tank.

8. A fuel tank vent pipe arrangement as set forth in claim 1, further comprising a rear cross member having a bent-up portion, said filler neck having a portion bent rearwardly of the vehicle body so as pass under said rear side member at said bent-up portion.

* * * * *